United States Patent [19]

Harnsberger

[11] 3,720,640

[45] March 13, 1973

[54] SAND CONSOLIDATION METHOD AND COMPOSITION

[75] Inventor: Bobby G. Harnsberger, Houston, Tex.

[73] Assignee: Texaco Inc., New York, N.Y.

[22] Filed: Nov. 27, 1970

[21] Appl. No.: 93,396

Related U.S. Application Data

[62] Division of Ser. No. 887,731, Dec. 23, 1969, Pat. No. 3,592,268.

[52] U.S. Cl. .............................260/336 R, 260/37 R
[51] Int. Cl. .........................................C08g 51/28
[58] Field of Search ...........260/33.6 R, 67 UA, 37, 260/DIG. 14; 106/287 SS

[56] References Cited

UNITED STATES PATENTS

| | | | |
|---|---|---|---|
| 3,272,777 | 9/1966 | Tshida | 260/67 UA |
| 3,634,302 | 1/1972 | Harnsberger | 260/32.8 R |
| 3,644,266 | 2/1972 | Harnsberger | 260/32.8 R |

*Primary Examiner*—Lewis T. Jacobs
*Attorney*—Thomas H. Whaley et al.

[57] ABSTRACT

Method of and composition for the treatment of unconsolidated sandy formations to stabilize a formation sand comprising injecting a treating composition of 10–60 percent by volume of acrolein dimer, 1 to 10 percent by volume of thionyl chloride catalyst, and 30 to 89 percent by volume of a non-aromatic petroleum solvent into said formation sand, polymerizing said dimer, and forming a fluid permeable consolidated sand in said formation.

4 Claims, No Drawings

SAND CONSOLIDATION METHOD AND COMPOSITION

This application is a divisional application of application Ser. No. 887,731, filed Dec. 23, 1969, now U.S. Pat. No. 3,592,268.

The present invention relates to the treatment of permeable underground formations. More particularly, the present invention relates to a method of treating permeable underground oil and/or gas containing formations to stabilize the sandy portion thereof and to a treating composition useful in the stabilization of incompetent sand containing underground formations.

The recovery of fluids such as gas and/or oil from underground formations has been troublesome in areas wherein the underground formation is composed of ore or more incompetent sand containing layers or zones. The sand particles in the incompetent zone and/or layer tend to move or migrate to the well bore during recovery of the formation fluids from the particular zone and/or layer and frequently the moving sand particles block the passageways leading to the well bore. Plugging or materially impairing the flow of the formation fluids toward the borehole results in a loss of these fluids to the producer or so decreases the rate of oil recovery from the well as to cause the well to be shutdown because it is economically unattractive to continue to produce therefrom. An additional adverse factor resulting from the movement of the sand particles toward the well bore is that they are often carried along with the formation fluids to the well bore and passed through the pipes, pumps, etc. being used to recover the formation fluids to the surface with resulting damage to the moving parts thereof as the said particles are very abrasive.

Many attempts have been made heretofore to prevent or decrease the flow of undesirable sand particles from the formation into the production tubing and associated equipment, such as by the placement of sand screens, filters, liners and so forth. These prior attempts have been unsuccessful for a number of reasons among which is that these mechanical devices fail to prevent completely the flow of the formation particles into the production equipment. In addition these devices interfere with various types of completion and workover operations. In recent years, the industry has attempted to avoid the difficulties encountered in the use of mechanical devices by employing various chemical compositions to effect consolidation of the underground incompetent formations. These methods have generally consisted of injecting into the underground formation polymerizable resinous materials which when subsequently polymerized form permeable barriers in the formation to prevent the sand particles from movement therethrough. However, this technique of sand consolidation has not met with widespread acceptance because of the inherent difficulties of effecting polymerization of the resinous materials in the formation to a degree sufficient to consolidate these underground formations and yet permitting the unobstructed flow of the desirable formation fluids therethrough. Further, the cost associated with these resin coating methods has been relatively high in comparison with the prior mechanical methods and the time required for resin polymerization is often rather lengthy at low temperatures.

By the method of the present invention one is able to treat effectively the underground formation to be stabilized in a rapid and efficient manner while minimizing the disadvantages of these prior art methods both mechanical and chemical.

One object of the present invention is to provide an improved method of treating underground sand containing formations to stabilize the incompetent formation. An additional object is to provide a fluid permeable consolidated formation sand between the loose formation sand and the well bore to prevent or to minimize the flow of unconsolidated sand particles therethrough while maximizing the flow of desired fluids and particularly petroleum hydrocarbons therethrough. A still further object is to provide a novel treating composition for use in stabilizing incompetent sand formations and to a method of placing same.

How these and other objects of the invention are accomplished will become apparent with reference to the accompanying disclosure. In at least one embodiment of the method of this invention at least one of the foregoing objects will be obtained.

It has now been discovered that an improved method of treating an incompetent sand containing underground formation comprises introducing into said formation a particular treating composition consisting essentially of a solution of 10 to 60 percent by volume of acrolein dimer from 1 to 10 percent by volume of a thionyl chloride catalyst, from 30 to 89 percent by volume of a non-aromatic petroleum solvent, and polymerizing the dimer in the formation to be consolidated. The resultant consolidated sand serves to prevent or to materially reduce the flow of the unconsolidated sandy particles therethrough while permitting the flow of desirable formation fluids at a substantially unimpaired rate.

In carrying out the method of the present invention it is necessary to first remove any water present in the formation since water will react with the thionyl chloride catalyst component of the treating composition and form gaseous products that may displace the treating solutions from the consolidation area. Thereafter the treating composition is pumped down the well bore under sufficient pressure to force the composition into the unconsolidated formation adjacent to or in reasonable proximity to the well bore. When the composition is suitably placed in the formation the well is shut in for the time required to effect polymerization of the dimer by the catalyst under the elevated temperature of the formation.

On polymerization the dimer component of the composition sets up and hardens and there is formed a fluid permeable consolidated sand that prevents or decreases the movement of sand particles therethrough into the well bore. After the dimer polymerizes and hardens, the well can be equipped for production, the formation fluids can be recovered therefrom by permitting these fluids to pass through the resulting formed consolidated sand in the formation into the well bore and recovered therefrom without the formation fluids being contaminated with the presence therein of unconsolidated sand particles.

The method of the present invention is particularly adaptable for use in any type of well completion but is generally used in a well wherein casing has been set and which has perforations therein at the desired intervals behind which the unconsolidated formation sands are located. Packers can be initially set above and below the perforated intervals to prevent the treating composition from passing into the non-isolated portions of the well and also to permit build-up of sufficient pressures on the said composition to force same through the perforations and into the formation without plugging up the well bore. After the treating composition has been forced through the casing perforations and into the unconsolidated dry sand formation the well is usually closed in for a suitable period of time to permit the polymer to set and harden.

The treating composition useful in the method of the present invention must meet certain specific requirements. The concentration of acrolein dimer present in the treating composition can vary from about 10 to about 60 percent by volume, with excellent results being obtained at concentrations of between 15 and 45 percent and particularly at about 20–25 percent for the most effective result. Amounts above about 60 percent of the dimer are to be avoided because the rate of polymerization is difficult to control. Concentrations below about 10 percent are not desirable because the consolidation is apt to be weak in compressive strength.

The solvent component should be of the non-aromatic petroleum type to effect solubilization of the dimer and avoid formation of a gel type polymer. Use of aromatic petroleum solvents gives use to gel type polymers soluble in the aromatic solvents and such aromatic solvents should be avoided for this reason. Representative non-aromatic petroleum solvents include kerosene and diesel oil fractions of suitable petroleum crudes. Selected petroleum fractions have been found suitable as the solvent component such as a kerosene or diesel fraction having a cetane number of at least about 45, and IBP of about 310°F. and an EP of about 530°F. Optionally one can incorporate a minor amount of a second solvent such as acetone to the composition in an amount of 1–10 percent by volume of the total solution.

The thionyl chloride catalyst component of the treating composition in the absence of water effects polymerization of the acrolein dimer component only at the relatively high temperatures found in the underground formation into which the treating solution is placed within a reasonable amount of time.

The catalyst is employed in an amount of from about 1 to about 10 percent by volume, preferably 3 to 7 percent by volume of the treating solution.

It is to be noted that at ambient temperatures the treating solution of dimer and catalyst in the non-aromatic petroleum solvent is relatively stable (will not polymerize to an objectionable degree) for a period of time sufficient to permit preparation of the solution and placement in the formation. On placement in the formation the formation temperature is sufficient to effect polymerization of the dimer with resultant consolidation of the formation. Typical formation temperatures effective to permit polymerization within about 24 hours are in the range of from about 100°F. up to 300°F., usually from about 100°F. to about 250°F.

In the practice of this invention it is necessary that the formation to be consolidated be essentially water free or dry. Drying of a water wet formation can be accomplished in a known manner such as by displacement with an organic solvent for water such as acetone, 2-propanol, dioxane and the like. An essential characteristic of this organic solvent is that it be non-reactive with the catalyst component.

The treating solution of the present invention is employed in the following manner.

After drying the formation, if necessary, the solvent solution of the acrolein dimer and catalyst is introduced into the bore hole and then displaced into the formation to be consolidated. Suitable displacement fluids for the treating solution include the solvent component of the solution itself or other similar products.

Rates of injection of the treating solution may vary from about one to about three gallons per minute per perforation. An injection rate of from about 1.5 to 2.5 gallons is preferred.

Following is a description by way of example of the method of the present invention.

EXAMPLE I

A 1 inch in diameter by 6 inches long glass tube was filled with a dry sand having a permeability of about 3 darcies.

The sand was treated with a kerosene solution (40 cc) of acrolein dimer (10 cc) and thionyl chloride (2.5 cc). The treated sand packed tube was placed in a pressure bomb, the pressure raised to 1900 psig and heated at 203°–212°F. for a 2 hour period. The pressure prevented boiling of the thionyl chloride.

Thereafter the consolidated sand was removed from the tube and compressive strength and permeability measurements were obtained. The consolidated sand had compressive strengths of 765–890 psi and a permeability of 1.58–1.95 darcies.

EXAMPLE II

The procedure of Example I was repeated using a treating solution consisting of 10 cc of acrolein dimer, 2.5 cc of thionyl chloride, 0.5 cc of a silane coupling agent, gamma glycidoxypropyltrimethoxysilane, in 40 cc of kerosene.

The consolidated sand pack of this example was found to have a compressive strength of 660–714 psi and a permeability of 2.75–2.84 darcies.

EXAMPLE III

The consolidated sands of Examples I and II were subjected to treatment by low pressure steam (15 psig). Steam was passed through the consolidated sands for a period of 35 days. Compressive strengths of the treated sands after these tests varied from 710–890 psig.

Obviously, many modifications and variations of the invention as hereinbefore set forth may be made without departing from the spirit and scope thereof and therefore only such limitations should be imposed as are indicated in the appended claims.

I claim:

1. A treating composition for use in forming a fluid permeable barrier film in a sand containing, unconsolidated-oil producing formation which comprises from 15 to 45 percent by volume of acrolein dimer, 3 to 7 percent by volume of thionyl chloride catalyst, 48 to 82 percent by volume of a non-aromatic petroleum solvent selected from the group consisting of a kerosene fraction and a diesel oil fraction, having a cetane number of at least about 45, said petroleum solvent having an IBP of about 310°F., and an EP of about 530° F. and 0 to 10 percent by volume of an oxygenated hydrocarbon solvent.

2. A composition as claimed in claim 1 additionally containing from 0.15 to 0.25 percent by volume of gamma glycidoxypropyltrimethoxysilane as a bonding agent.

3. A treating composition for use in forming a fluid permeable barrier film in a sand-containing, unconsolidated oil-producing formation which comprises from 10 to about 60 percent by volume of acrolein dimer, 1 to 10 percent by volume of thionyl chloride catalyst and 30 to 89 percent by volume of a non-aromatic petroleum solvent selected from the group consisting of a kerosene fraction and a diesel oil fraction, having a cetane number of at least about 45, said petroleum solvent having an IBP of about 310° F. and an EP of about 530° F., and 0 to 10 percent by volume of an oxygenated hydrocarbon solvent.

4. A composition as claimed in claim 3 additionally containing from 0.15 to 0.25 percent by volume of gamma glycidoxypropyltrimethoxysilane as a bonding agent.

* * * * *